Oct. 25, 1932. T. M. RECTOR 1,884,860
METHOD AND APPARATUS FOR EXTRACTING OIL FROM NUTS
Filed May 17, 1930
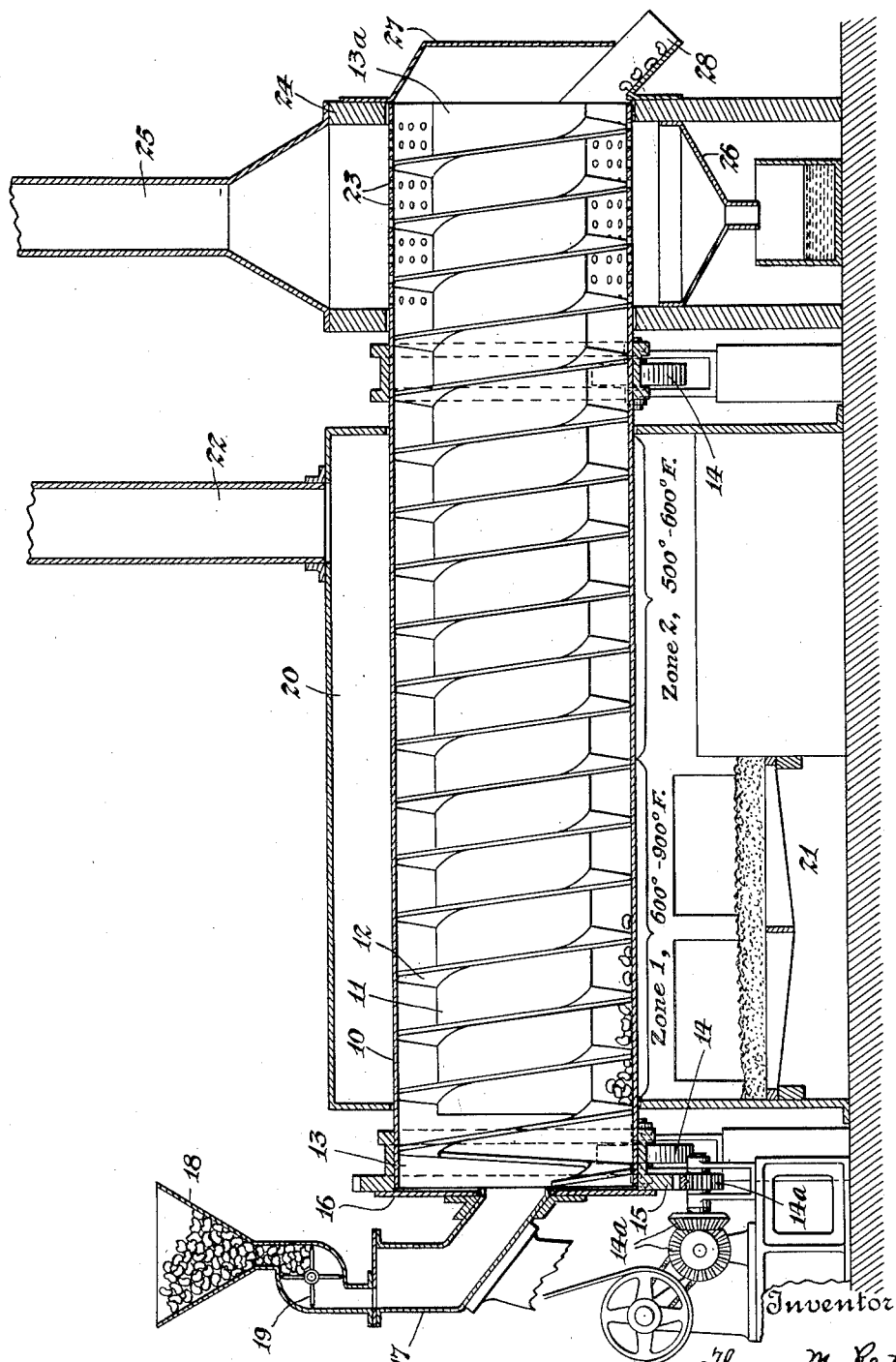
Inventor
Thomas M. Rector
By his Attorneys,
Ramsey and Kent.

Patented Oct. 25, 1932

1,884,860

UNITED STATES PATENT OFFICE

THOMAS M. RECTOR, OF RUTHERFORD, NEW JERSEY, ASSIGNOR, BY MESNE ASSIGNMENTS, TO VITAPACK CORPORATION, OF NEW YORK, N. Y., A CORPORATION OF NEW YORK

METHOD AND APPARATUS FOR EXTRACTING OIL FROM NUTS

Application filed May 17, 1930. Serial No. 453,248.

This invention relates to a process of and apparatus for extracting the oil from the shell of the cashew nut in such a way that the oil may be collected with a minimum of loss and the cashew nut prepared for shelling with a minimum of heating of the kernel.

The shell of the cashew nut contains twenty five percent of a dark corrosive oil substance which is soluble in alcohol and most organic solvents, but insoluble in water. It is now used to a very limited extent in India as a preservative for the bottoms of boats and for coating wood, paper, etc. as a protection against the attacks of insects. It has lately been found to have very remarkable and valuable chemical properties.

The cashew kernel is enclosed in a tough leathery shell containing the above described oil in comparatively large cells. The shell is approximately ⅛" in thickness. The kernel of the cashew nut is about one inch long and three eighths inch (⅜") in diameter at its point of greatest thickness.

The chemical composition of the kernel is similar to that of the almond. It contains about 45% of a bland yellow oil, the physical properties of which are like sweet almond oil. The chemical analysis of the oil is almost identical to that of pure olive oil. The cashew kernel is highly valued as a delicacy, being used as a salted nut and for baking and confectionery purposes.

The present method of preparing the nuts for shelling consists of heating a small quantity of the nuts in a flat pan over a hot fire until the shell of the nut is carbonized. During this process the shell oil evaporates in the form of a white smoke which later catches fire. The fire is quenched with sand and the nuts allowed to cool until they can be handled. They are then shelled by hand, the entire operation requiring skilled labor. Practically all the oil is lost during this method of shelling.

A method of extracting the shell oil is in use in India which consists in placing a large quantity of nuts in a cone shaped container and submitting to a long slow heating during which the oil collects at the point of the cone and is drawn off. In this process the kernels are injured greatly and have little commercial value.

The particular object of this invention is to provide mechanical means for automatically conducting the roasting and oil extracting operation in such a manner that the maximum quantity of oil will be collected with the minimum scorching of the cashew kernels.

Various other objects and advantages of the invention will be specifically pointed out or apparent hereinafter, in the course of a description of a preferred one of the various possible forms of apparatus according to the invention as shown in the accompanying drawing; it being understood, of course, that such form is merely illustrative of one combination and arrangement of parts calculated to facilitate the method of the invention, pursuant to present preference, and hence the detailed description now to be given is not to be taken as at all defining or limiting the invention itself.

In said drawing, the view is largely schematic, but illustrates clearly, partially in elevation and partially in vertical section, such a preferred form of apparatus.

This application is in part a continuation of my application Serial No. 249,532, filed January 26, 1928.

The invention consists broadly of heating the nuts in a closed vessel in such a manner as to cause the oil to exude from the shells but without scorching the nut kernels and without cracking the shell oil. Thereafter the oil and shells are separated and collected.

Certain important factors must be considered in carrying out the process. For example, it has been found that the kernal of the cashew nut scorches at about 250° F., and it is therefore important that the nut kernels should not exceed by any considerable amount a temperature of about 250° F., as above that temperature the kernels will become scorched and cannot be sold as edible nuts. It is also true that when the cashew oil is heated to a temperature in excess of about 600° F., it cracks into constituents that are different from, and apparently less valuable than, the cashew oil.

In the apparatus disclosed in the drawing, the nuts are heated in cylindrical member 10. An inner core 11 is placed within the cylinder 10 and a flange 12 forms a spiral channel from the closed receiving end 13 of the cylinder to the discharge end 13a. The cylinder is suitably supported as by the rollers 14 so that it can be rotated and means is provided for rotating the cylinder, such as the gears 14a which cooperate with a gear 15 mounted on the cylinder. The parts 10, 11 and 12 are fastened together in such a manner that they rotate as a unit.

The plate 16 closes the receiving end of the tube 10 and the chute 17 communicates with the interior of cylinder 10 by an aperture in the center of plate 16. The nuts are fed from the hopper 18 by means of the valve 19 which prevents backward flow of gases.

Suitable means is provided for heating the cylinder 10, the means illustrated being a furnace 20. The furnace is arranged with a fixebox 21 adjacent the receiving end of the cylinder, so that the hot gases in travelling from the firebox 21 to the stack 22, will cause the shell of cylinder 10 in zone 1, which is above the firebox, to reach a temperature of from 600 to 900° F., while in zone 2, which is adjacent the back end of the furnace, the shell of the cylinder will be heated to a temperature of from 500 to 600° F.

Near the delivery end 14 the cylinder 10 is perforated as indicated at 23 and the perforated zone of cylinder 10 is surrounded by a housing 24 formed with a flue 25 and an oil collecting device 26. A shield 27 protects the delivery end 14 of the cylinder 10 and a chute 28 provides for the discharge of the dust. When the machine is in operation, the nuts are carried forward continuously along the bottom of the cylinder 10 and the apparatus is timed in such a way that nuts are in the cylinder from two to four minutes; about three minutes being the preferred time.

The process of treating the nuts can be divided into the following steps:

(a) *Heating the nuts (zone 1). Subjecting the nuts in a closed vessel to external heat of from 600° to 900° F. for about one minute.*

While it is true that the cashew oil cracks at a temperature of about 600° F., it has been found possible to heat the nuts at a much higher temperature for a short interval of time, especially when they are heated on a moving metal surface as in the apparatus disclosed herein. During this short period of heating at high temperature, practically no oil appears on the outer surface of the nut and apparently a large part of the heat is conducted rapidly into the interior of the nut. The important consideration in this step seems to be to subject the nuts for a short time to as high a temperature as possible without driving oil from the shell and cracking it, and without causing tar to come from the shell. The high heat differential between the heating surface and the cold interior of the nut causes the shell of the nut to rapidly reach a high temperature conducive to removal of the oil without causing the kernel of the nut to reach a temperature above 250° F. In the preferred method of carrying out the process, this step of heating in zone No. 1 at high temperature should be for a period of about one minute although, as pointed out above, some variation in the time is permissible.

(b) *Holding the nuts in a closed vessel at an elevated temperature below 600° F. for about 1 minute. (Zone 2.)*

The nuts are now transferred to zone No. 2 where the shell of cylinder 10 is at a temperature of from 500° to 600° F. Soon after the nuts reach zone No. 2, the oil begins to literally spit from the shell. As the nuts pass through zone No. 2, the oil continues to pop from the nuts and collects in the bottom of the cylinder 10. It should be noted that practically none of the oil leaves the shells during the heating in zone No. 1 and as the temperature in zone No. 2 is below the cracking point of the oil, very little if any of the oil is destroyed by cracking.

(c) *Separating nuts, oil and gas*

After leaving the zone No. 2, the nuts pass through the separating zone where the oil falls through the perforations 23 and is collected in a suitable vessel, while the gases and fumes that have been generated during the heating and roasting of the nuts pass up through the stack 25. The nuts are discharged by way of chute 28.

The nuts must be heated in a closed vessel, as the temperatures used for driving the oil from the nuts are so high that ignition would occur if the nuts are exposed to air. In the apparatus disclosed herein, the receiving end of cylinder 10 is closed gas tight and the gases and fumes caused by the heating of the nuts move toward the delivery end of cylinder 10, driving out any air and thus preventing ignition of the nuts as they pass through zones Nos. 1 and 2. By the time the nuts reach the discharge end of cylinder 10, they have been cooled below the ignition temperature and they therefore can safely be discharged into the open air.

In the above description for purposes of clarity the zones Nos. 1 and 2 have been treated as separate and distinct, but in fact the zone of high temperature merges gradually into the zone of low temperature.

It will be clear that the process is not limited to the particular apparatus disclosed herein—for example, steps (a) and (b) can be carried out in any suitable closed vessel, and the oil, nuts and gas can be separated in any convenient manner.

The process may be used for removing oil from the nut shells after the kernels have been removed from the shells. In this case the empty shells will be delivered to hopper 18 and will be carried through the same treatment as the nuts in the process described above.

I claim

1. Apparatus for removing oils from the shells of nuts comprising a heating chamber having one end closed against the escape of gas, means for feeding the nuts to the chamber at a point adjacent the closed end, the other end of the chamber being provided with separating means for separating the nuts from fluids, means for heating the chamber in such a way as to provide a zone of high temperature adjacent the closed end of the chamber and a second zone of lower heat between the zone of high heat and the separating means, and means to move nuts through the heating zones to the separating means.

2. Apparatus for removing oils from the shells of nuts, comprising a rotatable cylinder having a receiving end and a discharge end, means to deliver nuts to the cylinder adjacent the receiving end, the wall of the cylinder being perforated adjacent the discharge end, means for heating the cylinder in such a way as to provide a zone of high temperature adjacent the closed end of the chamber and a second zone of lower temperature between the zone of high temperature and the perforated part of the cylinder, and a spiral flange integrally attached to the inside of the cylinder and providing means for conveying the nuts from the receiving end of a cylinder through the two heating zones, past the perforated part of the cylinder and to the discharge end of the cylinder.

3. The method of removing oils from the shells of cashew nuts which comprises subjecting the whole nuts to a temperature above the cracking point of the shell oil for a short period while maintaining the nuts out of contact with air, thereafter holding the nuts at a temperature below the cracking point of the shell oil for a short time while maintaining the nuts out of contact with air to permit the oil to run from the shells, and separating the oil and the nuts.

4. The method of removing oils from the shells of cashew nuts which comprises subjecting the whole nuts to a temperature above the cracking point of the shell oil for about one minute while maintaining the nuts out of contact with air, thereafter holding the nuts at a temperature below the cracking point of the shell oil for about one minute while maintaining the nuts out of contact with air to permit the oil to run from the shells, and separating the oil and the nuts.

5. The method of removing oils from the shells of cashew nuts which comprises subjecting the whole nuts to a temperature of approximately 600 to 900° F. for a short time while maintaining the nuts out of contact with air, thereafter holding the nuts at a temperature below 600° F., for a short time while maintaining the nuts out of contact with the air to permit the oil to run from the shells, and separating the oil and the nuts.

6. The method of removing oils from the shells of cashew nuts which comprises subjecting the whole nuts to a temperature of approximately 600 to 900° F. for about one minute while maintaining the nuts out of contact with air, thereafter holding the nuts at a temperature below 600° F., for about one minute while maintaining the nuts out of contact with the air to permit the oil to run from the shells, and separating the oil and the nuts.

7. The method of removing oils from the shells of cashew nuts which comprises moving the whole nuts for about one minute over a metal surface heated to a temperature of about 600 to 900° F. while maintaining the nuts out of contact with air, thereafter holding the nuts at a temperature below 600° F. for about one minute while maintaining the nuts out of contact with the air to permit the oil to run from the shells, and separating the oil and the nuts.

THOMAS M. RECTOR.